Jan. 19, 1965     O. LINDSTRÖM     3,166,478
METHOD AND MEANS FOR CONTROLLING THE QUANTITY OF FISSION
GAS IN HOMOGENEOUS BOILING REACTORS
Filed Nov. 28, 1960     2 Sheets-Sheet 1
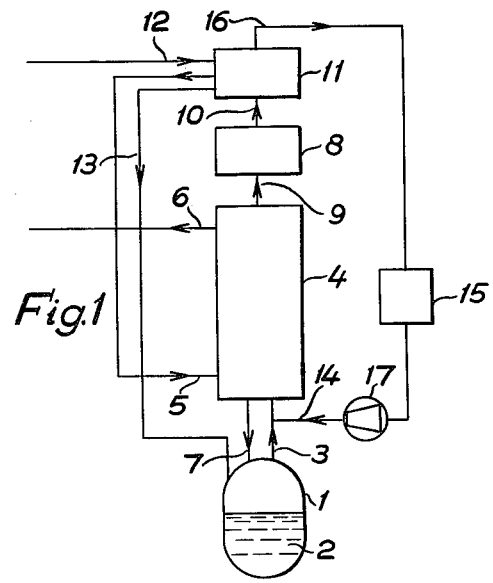
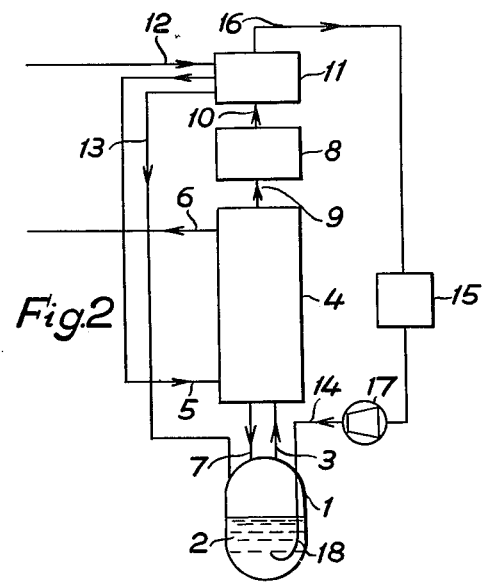
INVENTOR.
OLLE Lindström
BY
Bailey, Stephens & Huettig
ATTORNEYS

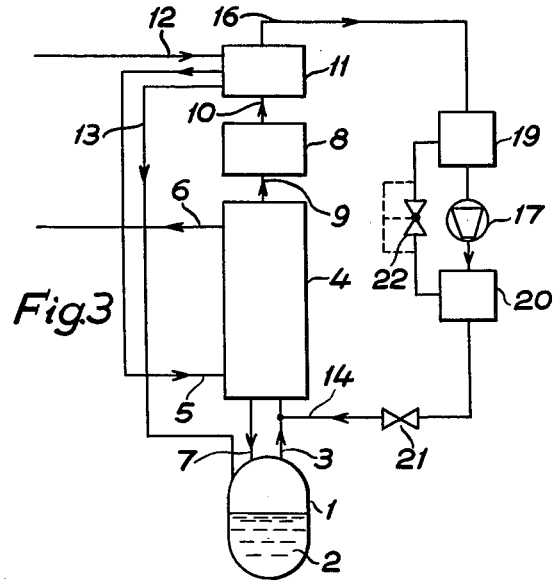
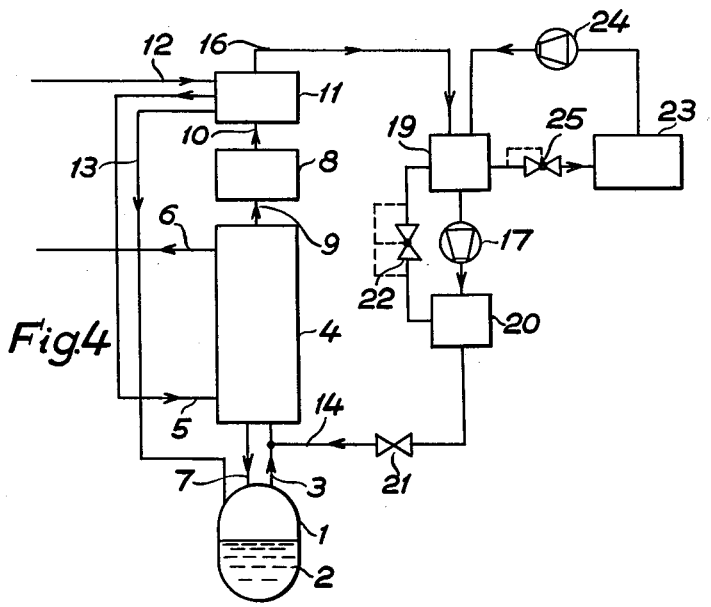

United States Patent Office 3,166,478
Patented Jan. 19, 1965

3,166,478
METHOD AND MEANS FOR CONTROLLING THE QUANTITY OF FISSION GAS IN HOMOGENEOUS BOILING REACTORS
Olle Lindström, Vasteras, Sweden, assignor to Allmänna Svenska Elektriska Aktiebolaget, Vasteras, Sweden, a Swedish corporation
Filed Nov. 28, 1960, Ser. No. 72,205
Claims priority, application Sweden, Dec. 2, 1959, 11,339/59
8 Claims. (Cl. 176—37)

A homogeneous boiling reactor, while in operation, produces steam which is condensed in a condenser, whereby the heat thus liberated is taken care of. In the reactor and in the system containing the reactor and the condenser, strong radio-active fission gases are produced which are mixed with radiolytic gases. It is above all Xe 135 amongst the fission gases which gives the dominating contribution to the poisoning of the reactor core which occurs during the reactions taking place. In order to eliminate the adverse influence of the fission gases on the operation of homogeneous reactors, according to the current technical standpoint, the fission gases are continuously removed from the reactor systems and at the same time purified in a gas purifying system, the most important components of which are beds with active carbon in which the gases are absorbed for decay before being afterwards led off to the chimney. This method of treating exhaust is expensive and furthermore unsatisfactory in several respects. Thus there is a risk of channeling in the carbon beds, whereby their capacity becomes a fraction of that intended, and risk of ignition. The quantity of fission gas which can be discharged to the chimney is extremely small and operational disturbances in the carbon beds could thus give rise to serious problems from a hygiene point of view because of the increased quantity of fission gases which can thereby escape via the chimney.

The present invention relates to a method of controlling the quantity of fission gas in the reactor core in a homogeneous boiling reactor and eliminating the noxious influence of the fission gases, whereby at the same time the inconveniences connected with the above described and previously used method for treating exhaust are completely avoided. The invention is characterised in that fission gas formed during operation is accumulated in a permanent gas mass in such a way that gas from the permanent gas mass is continuously supplied to the steam, before or while it is condensed and this gas together with an addition of fission gas after the condensation is returned to the gas mass. The permanent gas thus circulates in a closed system. For practising the method a device may, with advantage, be used comprising at least a storage tank for the permanent gas, which tank is connected by means of conduits to the reactor system on both sides of the condenser and a device, for example a fan or compressor which brings about the transport of the permanent gas to and from the reactor system and through the storage tank. It is advantageous to allow the device to contain two storage tanks, namely one storage tank from which permanent gas is fed to the reactor system and a second storage tank in which the permanent gas from the reactor is collected and a fan, compressor or the like arranged between these two storage tanks, which further conveys the gas from the receiving tank to the feeding tank. According to a particularly suitable embodiment of the invention, at least one storage tank is connected via a pressure-regulated valve and compressor, fan or the like, to an expansion tank.

The invention is best described with the help of the enclosed schematical figures which, as examples, show different devices for carrying out the method according to the invention.

FIGURES 1 and 2 show devices for practising the process according to the invention, which contain one storage tank.

FIGURE 3 shows another device for practising the method process according to the invention, which contains two storage tanks, namely a feeding tank and a receiving tank.

Finally, FIGURE 4 shows a device with two storage tanks and with an expansion tank connected to one of these.

The boiling reactor core 2 of the reactor vessel 1, which core contains light or heavy water as moderator in the device according to FIGURE 1 delivers steam which arrives in the condenser 4 through the conduit 3. The steam is condensed here and gives off its heat content to the feeding water led in at 5 and drawn off at 6. The condensate is returned through the conduit 7 to the reactor core. The homogeneous boiling reactor also emits oxyhydrogen gas because of the radiolytic decomposition of the moderator. The oxyhydrogen gas is recombined in the recombiner 8. The duct between the condenser 4 and the recombiner 8 has been designated 9. Possibly remaining gas from the condenser 4 together with steam formed in the recombiner and possibly remaining oxyhydrogen gas are led through the duct 10 to a tail condenser 11, which is suitably supplied at 12 with feeding water on the secondary side. This water can also be employed to cool the condenser 4, whereby it enters the condenser 4 on its secondary side as feeding water through the duct 5. The condensate formed in the tail condenser is returned to the reactor core via the duct 13. The shown system for externally recombining the oxyhydrogen gas essentially consists of the recombiner 8 and the tail condenser 11 drops out, of course, if internal recombination can be brought about, for example, by the addition of catalysts to the reactor fuel.

The steam arising from the reactor core is supplied through the duct 14 with permanent gas, for example, hydrogen, deuterium, oxygen, helium, whereby the choice of gas is influenced by the chemical composition of the reactor core. The permanent gas which comes from the storage vessel 15, is mixed with steam and, when it has passed the condenser 4 and the possibly connected arrangements 8 and 11, is returned through the duct 16 to the storage vessel 15. The circulation of the permanent gas in this closed system is brought about by the gas pump 17.

If no permanent gas was supplied and no such gas was present at condensation the concentration of the noxious fission gases in the reactor core would soon be too high for an economic and safe operation of the rector. An increased quantity of fission gas deteriorates the neutron economy and therefore requires an excess reactivity in the reactor core, which in turn involves risks of instability in operation. Poisoning of the reactor core is caused almost entirely by xenon isotopes and amongst these almost solely by Xe 135 which, a very short time after starting the reactor, is present in a steady state concentration. Because of the inconveniences which an accumulation of fission gases in the reactor core of a homogeneous reactor involve it has, as has been dealt with in the introduction, been necessary with such reactors to take off the fission gases to special purifying equipment.

By supplying the permanent gas, in accordance with the invention, to the system so that the permanent gas is present during condensation of the steam coming from the reactor core a substantial stripping of fission gas from the reactor core is produced. Thus the fission gases will now distribute themselves between the liquid phase in the reactor core and the gas phase. If the system is suitably dimensioned, the greater part of the fission gases, including Xe 135, can be brought to say in the permanent gas volume and only a little in the reactor core which is not dangerous for the reaction process. For Xe 135, it is particularly important that this mentioned part is constant or nearly constant. The fission gas contains an accumulating part of stable isotopes and a part with steady state concentrations or unstable isotopes. The decay of the unstable isotopes of the fission gases occurs mainly within the permanent gas mass, through which at least a part of the heat thus developed can be usefully used for the production of energy.

One circumstance which must be taken into consideration when choosing the quantity of permanent gas is that the content of fission gases in the permanent gas which, as mentioned above, increases during the operation time of the reactor must not be so large that because of the distribution between the gas phase and reactor core, the part of the fission gas present in the reactor core reaches a noxious concentration. The quantity of permanent gas mass is also influenced by several other factors, for example, by the specific and total power of the reactor, its steam fraction and operation pressure. It has been found that the necessary quantity of permanent gas mass is surprisingly small. In most cases this necessary gas quantity for the operation pressure and operation temperature of the reactor occupies a volume which is equal to about half the volume of the reactor core. Besides the fission gases distributing themselves in the above mentioned advantageous way between the liquid phase in the reactor core and the gas phase and besides the fact that waste disposal taking place outside the system can be avoided, there arises with the method according to the invention further the substantial advantage that non-recombined oxyhydrogen gas accompanies the permanent gas in its circulation, to the effect that the recombining means need not be dimensioned for complete recombining of passing oxyhydrogen gas.

FIGURE 2 shows an alternative embodiment of the arrangement according to FIGURE 1, in which the permagas is led directly into the recator core 2 via a feeding pipe 18.

The arrangement according to FIGURE 3 contains two storage tanks, one receiving tank 19 in which the gas which has passed the cooling means of the reactor is collected, and a feeding tank 20 from which the permanent gas is supplied to the reactor system. Between the receiving tank and the feeding tank a gas pump 17 is arranged consisting of a fan, compressor or the like. This boosts the pressure from the receiving tank to the feeding tank so that a circulation of gas is maintained. The circulation is regulated by a throttle valve 21. A constant pressure difference between the receiving and feeding tanks is maintained with the control valve 22.

The arrangement according to FIGURE 4 corresponds largely with that in FIGURE 3, but it contains also a circuit with an expansion tank 23 and with means for keeping the pressure in the receiving tank constant. The said means could, in accordance with the figure, consist of a gas pump 24, for example a compressor, fan or the like and a pressure regulated valve 25.

A primary object of the permanent gas used is that it shall have a low absorption cross section for neutrons. Suitable permanent gases first of all are deuterium, helium and oxygen gas but it is also possible to use hydrogen gas, nitrogen gas, neon and argon. In homogeneous heavy water boilers with dispersion fuel, for example uranium and thorium oxides, it is particularly advantageous to use deuterium as permanent gas, while in such boilers with solution fuel, for example with uranium sulphate, suitably oxygen gas or a mixture of oxygen gas and helium may be used. Deuterium has the advantage that it can easily be removed by burning, directly or catalytically with oxygen gas, if it is desirable to decrease the pressure in the storage tank, for example the expansion tank 23, without it being necessary for this purpose to lead off the gas to the surroundings, or if it is desired to extract the fission gases in concentrated form. The same viewpoint can be taken with the use of oxygen gas which can be reacted to water in a similarly easy way.

In the following an example of an embodiment of the invention is described indicating the conditions of operation for, for example, a chosen case, which refers to the arrangement according to FIGURE 4. One or several rector cores 2 consisting of thorium oxide (200 g./l.) dispersed in heavy water and enriched material U 233 or U 235 emit 10 m.$^3$ saturated steam per sec. of 280° C. and 64 bars. This reactor core does not contain catalysts for internal recombining of radiolytically formed oxyhydrogen gas so the steam contains about 0.5 percent volume of oxyhydrogen gas, which is recombined in a recombiner 8. The permanent gas consisting of deuterium is supplied in a flow of about 1% of the steam flow, i.e. 0.1 m.$^3$/sec. After condensation of the steam, the permanent gas is led through a conduit 16 to the receiving tank 19, which may consist of a number of parallel or series connected gas cylinders with a total volume of 15 m.$^3$. The compressor 17 pumps 0.2 m.$^3$ gas per sec. to the receiving tank 20, likewise with a volume of 15 m.$^3$. The pressure difference between the receiving tank and the feeding tank amounts to 0.5 bar. The expansion tank 23 has the volume 30 m.$^3$ and the pressure is normally 5 bars, but the tank can withstand the whole operating pressure. As previously mentioned the quantity Xe 135 is at steady state, constant. Considered as the gas quantity, it is very small. The total quantity of fission gas increases by 0.2 percent volume per year, calculated on the volume of the permanent gas. Noxious high concentration of fission gases do not arise during the expected operation time of the reactor, 25 years.

For reactor systems of the mentioned type it is as a rule suitable to supply a permanent gas quantity of 0.3–3%, most frequently about 1% of the steam quantity.

What I claim is:

1. In a reactor system comprising a homogeneous boiling water reactor in which steam having a content of heat is produced during operation, a condenser, the system including means to conduct steam from the reactor to the condenser and means to conduct water from the condenser to the reactor, at least one storage tank containing a permanent gas, conduits connecting the storage tank to the reactor system on both sides of the condenser, and a gas conveying means for conveying the gas to and from the reactor system and through the condenser and the storage tank, the permanent gas taking up fission gas in its passage in the system.

2. In a reactor system comprising a homogeneous boiling water reactor in which steam having a content of heat is produced during operation, a condenser, the system including means to conduct steam from the reactor to the condenser and means to conduct water from the condenser to the reactor, a first storage tank containing a permanent gas to be fed to the reactor system, a second storage tank for collecting permanent gas from the reactor system, conduits connecting the storage tanks to each other and connecting one tank to the reactor system on one side of the condenser and the other tank to the reactor system on the other side of the condenser, and a gas conveying means between the first and the second storage tanks for conveying the gas collected in the second tank to the first tank and for conveying the gas from the first storage tank to the reactor system on one side of the condenser and from the reactor system on the other side of the condenser to the second storage tank, the permanent gas taking up fission gas in its passage in the system.

3. In a reactor system as claimed in claim 1, an expansion tank, and means connecting the storage tank to the expansion tank.

4. In a reactor system comprising a homogeneous boiling water reactor, in which steam having a content of heat is produced during operation, a condenser, the system including means to conduct steam from the reactor to the condenser, a first storage tank containing a permanent gas to be fed to the reactor system, a second storage tank for collecting permanent gas from the reactor system, an expansion tank, means connecting at least one of the storage tanks to the expansion tank, conduits connecting the storage tanks to each other and connecting one tank to the reactor system on one side of the condenser and the other tank to the reactor system on the other side of the condenser, and a gas conveying means between the first and the second storage tanks for conveying the gas collected in the second tank to the first tank and for conveying the gas from the first storage tank to the reactor system and from the reactor system to the second storage tank, the permanent gas taking up fission gas in its passage in the system.

5. Method of controlling the quantity of fission gas in a reactor core of a homogeneous nuclear reactor in a reactor system, producing steam having a heat content in the reactor core, recovering the heat content of the steam by condensation of the steam in a condenser, continuously supplying permanent gas from a mass thereof to the steam leaving the reactor core, thereby accumulating fission gas formed during operation in the permanent gas, the permanent gas obtaining a content of fission gas in its contact with the steam, and returning the gas from the condenser together with any addition of fission gas taken up in the reactor system to the gas mass with a continuous increase of the content of fission gas in the permanent gas mass as well as in the permanent gas supplied to the reactor system.

6. Reactor system comprising a homogeneous boiling water reactor with a reactor core having a volume, in which reactor core steam having a heat content is produced during operation, a condenser for recovering the heat content of the steam, the system including means to conduct steam from the reactor to the condenser and means to conduct water from the condenser to the reactor, at least one storage tank containing a permanent gas mass having a volume, conduits connecting the storage tank to the reactor system on both sides of the condenser, and a gas conveying means for conveying the gas to and from the reactor system and through the storage tank, the volume of the permanent gas mass being at least about half the volume of the reactor core.

7. A reactor system as claimed in claim 1 in which the permanent gas is selected from the group consisting of deuterium, helium, oxygen, hydrogen, nitrogen, neon and argon.

8. Method as claimed in claim 5, in which the permanent gas is selected from the group consisting of deuterium, helium, oxygen, hydrogen, nitrogen, neon and argon.

References Cited by the Examiner

UNITED STATES PATENTS 3,080,307   3/63   Rinald _____ 204—193.2

FOREIGN PATENTS 755,495   8/56   Great Britain.

OTHER REFERENCES

AEC Document, LA-1337, "Gas Recombination System of the Los Alamos Homogeneous Reactor," March 1962, pp. 6, 7, 13.

AEC Document, ORO-33, "Program Administration and Installation Design of the Nuclear Reactor Project at North Carolina State College," pp. 43–47.

Proceedings of the International Conference on the Peaceful Uses of Atomic Energy, vol. 3, 1955, pp. 169–174.

REUBEN EPSTEIN, *Acting Primary Examiner.*

CARL D. QUARFORTH, *Examiner.*